United States Patent [19]

Vaginay

[11] 3,980,620

[45] Sept. 14, 1976

[54] POLYESTERAMINES WITH IMPROVED DYE AFFINITY AND PROCESS FOR THEIR PRODUCTION

[75] Inventor: Yves Vaginay, Lyon, France

[73] Assignee: Rhone-Poulenc-Textile, Paris, France

[22] Filed: Oct. 15, 1974

[21] Appl. No.: 514,784

[30] Foreign Application Priority Data

Oct. 15, 1973 France .............................. 73.36977
Mar. 11, 1974 France .............................. 74.08425

[52] U.S. Cl. .............................. 260/75 N; 8/168 C; 260/75 M
[51] Int. Cl.² .................. C08G 63/20; C08G 63/68
[58] Field of Search ................................... 260/75 N

[56] References Cited
UNITED STATES PATENTS

| | | | |
|---|---|---|---|
| 2,647,104 | 7/1953 | Shivers.............................. | 260/75 N |
| 2,739,958 | 3/1956 | Lincoln et al...................... | 260/75 N |
| 2,744,086 | 5/1956 | Mowry et al.................. | 260/75 N X |
| 3,432,467 | 3/1969 | Davies et al. .................. | 260/75 N X |
| 3,823,117 | 7/1974 | Freudenberger et al. ......... | 260/75 N |
| 3,835,099 | 9/1974 | Munakata......................... | 260/75 N |
| 3,867,479 | 2/1975 | Spanninger ...................... | 260/75 N |
| 3,886,230 | 5/1975 | Marcus.............................. | 260/75 N |

FOREIGN PATENTS OR APPLICATIONS 2,090,283 1/1972 France

Primary Examiner—Murray Tillman
Assistant Examiner—W. C. Danison, Jr.
Attorney, Agent, or Firm—Stevens, Davis, Miller & Mosher

[57] ABSTRACT

Polyesteramines with good dye affinity for anionic dyestuffs formed by reacting
a. at least an aromatic dicarboxylic acid and possibly a small amount of an aliphatic diacid,
b. at least a diol having at least 3 carbon atoms such as an aliphatic, a saturated alicyclic or a cycloaliphatic diol, and
c. at least a compound of the formula $NR_3$ where R, being the same or different, is alkyl, saturated alicyclic, cycloalkyl or arylaliphatic, or where two R groups form a cycle between them. The $NR_3$ compound has 1, 2 or 3 R groups containing 0, 1, 2 or 3 ester generating groups with the total number of ester generating groups being 1 to 3. The $NR_3$ compound has no more than two R groups being arylaliphatic or cycloaliphatic which have only one carbon atom between the cycle and the nitrogen atom or being saturated alicyclic and there are at least 3 or more carbon atoms between the ester generating groups and the nitrogen atom.

The total amount of the $NR_3$ compound is present so that the percentage of nitrogen fixed on the polymer is at least 0.03% by weight of the polymer.

Yarns made from these polyesteramines are used in a variety of textile applications.

7 Claims, No Drawings

POLYESTERAMINES WITH IMPROVED DYE AFFINITY AND PROCESS FOR THEIR PRODUCTION

BACKGROUND OF THE INVENTION

1. Field of the Invention

This invention relates to polyesteramines with good dye affinity for anionic dyestuffs and to the process for their production.

More particularly, it relates to polyesteramines containing tertiary amino groups sited in the polymer chain or laterally in relation to the chain, and made from diols containing at least three carbon atoms in the molecule.

It relates also to yarns and fibers made from these polymers, as well as to molded articles.

2. Description of the Prior Art

Polyesters derived from aromatic dicarboxylic acids, particularly from terephtalic acid and aliphatic, saturated alicyclic or cycloaliphatic diols containing at least three carbon atoms in the molecule are of great commercial interest due to a variety of end uses as a result of their high tenacity, flexibility, crease resistance, etc.

The yarns and fibers made from these polymers, however, are not easy to dye since there are no reactive sites in the macromolecular chains. Although there exist many techniques to add dye holding components to fibers, they all fail to improve the dye affinity for polyesteramines.

In U.S. Pat. No. 2,739,958 spinnable aromatic polyesters containing tertiary amino groups in the molecule, at the level of at most 1% by weight of nitrogen in relation to the polymer, are prepared by mens of either bis-($\omega$-hydroxyalkyl)-alkylamine where the alkyl chain joining hydroxyl groups is preferably as short as possible, bis($\omega$-hydroxyalkyl)-arylamine or aralkylamine, or bis($\omega$-carboxyalkyl)-alkylamine, -arylamine or aralkylamine compounds.

These compounds carry on the nitrogen atom at least an alkyl group having only one or two carbon atoms. These compounds cannot improve the dyeability of polyesters made from diols having at least three carbon atoms in the molecule.

In U.S. Pat. No. 2,744,086 a mixture of acrylic polymers and homopolyesters which are made from carboxylic diacids, glycols containing one or several tertiary amino or quaternary ammonium groups in the chain are used where the tertiary amino groups can be made from diacids corresponding to the formula:

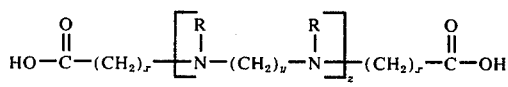

or from diols corresponding to the formula:

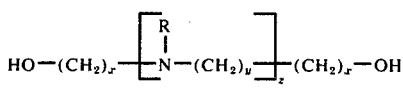

with
$x, y = 1$ or $2$
$z = 0$ or $1$
$R$ = alkyl, aralkyl or a cycloalkyl group.

The homopolyesters alone do not produce a yarn exhibiting good textile quality. The diols, on the other hand, only improve to a slight degree the dye affinity of polyesters made from diols containing at least three carbon atoms in the molecule for anionic dyestuffs. Besides, as indicated in this patent, they are designed for obtaining homopolyesters only and are only used in mixtures with acrylic polymers.

In U.S. Pat. No. 2,647,104, polyethylene-glycol terephthalate is modified by treating the polymer at 100°–275°C with functional aminated compounds until the polymer is made dyeable with acid or direct dyestuffs, but this treatment must be stopped before yellowing. In order to be dyeable, polymers should contain from 0.15 to 0.4% nitrogen. Such a process, however, requires a technically complicated and critical treatment. Furthermore the nitrogen ratios necessary for good dye affinity are high which reduces the profitability of the process from a commercial standpoint.

It is also known to improve polyolefin dyeability by the addition of a polyester resin containing tertiary amino groups at the level of 0.1 to 2% by weight of nitrogen in relation to the whole composition. These polyester resins, however, can only be used in mixtures and are not spinnable alone.

Finally, in German application 2,150,293 polyesters are modified with tribenzylamine or its derivatives. But the dyeability obtained with this type of compound is very little.

It has now been found that polyesteramines with a good dye affinity for anionic dyestuffs can issue from:

a. at least an aromatic dicarboxylic acid and possibly a small quantity of an aliphatic diacid, b. at least an aliphatic, saturated alicyclic or cycloaliphatic diol having at least three carbon atoms in the molecule, and c. at least a compound corresponding to the formula $NR_3$ in which R being identical or different represents alkyl, saturated alicyclic cycloalkyl or arylaliphatic groups, one, two or three of the R groups carrying zero, one, two or three ester generating groups with the total number of the ester generating groups being from 1 to 3. Two of the R groups can form a cycle between them, but at most only 2 R groups can be saturated alicyclic or arylaliphatic or cycloaliphatic radicals containing one carbon atom only between the cycle and the nitrogen atom. The $NR_3$ compound must have at least 3 carbon atoms between the ester generating groups and the nitrogen, and the proportion of the $NR_3$ compound or compounds used is such that the percentage of nitrogen fixed on the polymer is at least 0.03% by weight in relation to the polymer.

This invention relates also to all shaped articles obtained from these polymers, such as filament yarns, staple fibers, woven and knitted fabrics, molded articles, etc.

It relates also to a process for the production of said polyesteramines, in which the diol having at least three carbon atoms is allowed to react with the methyl ester of the diacid and the compounds corresponding to the formula $NR_3$ are added when at least 90% by weight of the theoretically produced methanol is eliminated from the reaction medium.

In a preferred embodiment the aminated compound or compounds are introduced about 10 minutes before attaining the pressure and temperature conditions which bring about the vaporization of the compounds in order to avoid their immediate vaporization.

It is particularly surprising to see that on adding the compound or compounds corresponding to the formula NR₃ at the beginning of the reaction, i.e. before 90% of the theoretically produced methanol is eliminated from the reaction medium, the compound or compounds decompose to a great extent whereas, later on, when 90% of the theoretical methanol is produced, said compound or compounds are nearly entirely recovered in the final polymer. The temperature at which the beginning of the reaction is carried out is in any case lower than the temperature at which this compound or compounds are introduced in the reaction medium. This criterion applies to whatever polymer type is desired or whichever aminated compound or compounds are introduced. This embodiment is especially advantageous when using less stable aminated compounds.

Among all the diols presently known for the production of polyesters made from aromatic diacids and particularly from terephthalic acid, it has been found that only diols containing at least three carbon atoms are suitable for the production of polyesteramines according to the invention. On polyesteramines made from diols containing less than three carbon atoms, such as ethyleneglycol and containing the same compounds with tertiary amino groups, there is observed only a little improvement of the dye affinity and an unsatisfactory yellowing.

In the same way, by polycondensating compounds containing tertiary amino groups of the prior art with a diol containing at least three carbon atoms and at least an aromatic diacid, polyesteramines with good dyeability are also not obtained.

Surprisingly, it has been found that a double selection was necessary:

a. the use of diols having at least three carbon atoms in the molecule, and b. the use of compounds with particular tertiary amino groups.

By compounds with tertiary amino groups are meant those compounds corresponding to the general formula NR₃, in which R is identical or different and represents either alkyl, saturated alicyclic, cycloalkyl or arylaliphatic groups with one, two or three R groups carrying zero, one, two or three ester generating groups. The total number of ester generating groups is from 1 to 3 with the possibility that two of the R groups form a cycle, but no more than two of them being arylaliphatic or cycloaliphatic radicals comprising one carbon atom only between the cycle and the nitrogen atom, or saturarted alicyclic radicals.

In addition, the number of carbon atoms between the ester generating group or groups and the nitrogen atom is at least 3 and preferably comprises between 3 and 20.

The ester generating groups may be —OH, —COOR', or anhydride groups with R' being a hydrogen atom or an alkyl group. The compound may contain different ester generating groups, and particularly, it may contain COOR' and OH groups simultaneously.

Compounds with tertiary amino groups may also be polycondensated with any suitable compound such as an aliphatic or aromatic diacid, for example, before being added to the reaction mixture.

The tertiary amino groups of said compounds may not be situated on the polymer chain, but in a lateral configuration in the case where two ester generating groups are placed on the same R group.

Among usable compounds, N,-N-ω-dihydroxyalkylamines, such as the N,N-ω-dihydroxyhexyl-hexylamine or the N,N-ω-dihydroxyhexyl-benzylamine, or N,N-(di-ω-alkylalcanoates)alkylamines such as the N,N(dimethylhexanoate) hexylamine, the N(methyl-5methylisophthalate)piperidine.

If desired, a small amount of an aliphatic diacid and/or a polyethyleneglycol may be added, for example up to 10% by weight in relation to the total weight of the polymer.

The compounds with tertiary amino groups are used in such quantities that the percentage of nitrogen on the polyesteramine obtained is higher than 0.03% by weight in relation to the weight of the polymer.

The percentage of nitrogen fixed on polymer may be from 0.05% to 0.5% by weight, though the superior limit may be higher, but preferably from 0.05 to 0.13%. However, the use of percentages higher than 1% is of little interest with regard to dye affinity and it does not save much. As a result of using the process according to the present invention the loss of aminated compounds is very low.

The polymers obtained exhibit a good dye affinity for anionic dyestuffs and this is particularly attractive when these polymers are designed for spinning. These polymers may also be molded in the conventional manner.

The color of the articles obtained, after dyeing with anionic dyestuffs, exhibits good light-fastness, washing-fastness, dry cleaning-fastness and sublimation-fastness.

When preparing yarns for use in textiles, it is possible to dye wool and polyesteramine blends simultaneously. Such a technique is of great practical interest and is very economical.

In the following examples, dyestuffs are mentioned by their reference CI (Colour Index, edition 1971 and its additions) and the viscosity index VI is determined from the viscosity in solution measured at 25°C on a solution of 1% by weight per volume of polymer in orthochlorophenol by the formula:

$$VI = \frac{\text{specific viscosity}}{\text{concentration}} \times 1000$$

in which the concentration is expressed g/100 cm³. The parts and percentages are given on a weight basis.

The following Examples are to illustrate the present invention and are not to be interpreted to restrict the invention as defined in the claims.

EXAMPLE 1

Into a stainless steel reactor fitted with heating and regulation means, the following ingredients are loaded simultaneously:

1,940 parts of dimethylterephthalate
1,150 parts of 1,4-butanediol
0.45 parts of triethanolaminepolytitanate Alcohol formation starts about 161°C. After about 1 hour, all of the theoretically formed methanol is distillated. When the reaction mass reaches 240°C, 0.45 part of triethanolaminepolytitanate is added and at 245°C, 44 parts of a 20% titanium oxide suspension by weight are added.

At 250°C, pressure is gradually reduced, and when this reaches 200 torrs and 95% of the theoretically produced methanol is distillated, 61.5 parts of N,N-di(ω-hydroxyhexyl)benzylamine are added through a vacuum-locked chamber.

After 30 minutes, the pressure is 0.7 torr and the polycondensation is continued for 20 minutes at 254°C.

The distillates recovered during the operation (from the formation of methanol, from excess 1,4-butanediol, and from the traps of the vacuum circuit) are collected and they are diluted fivefold with water and titrated with hydrochloric acid in the presence of methyl red.

The results are given in Table I, below.

EXAMPLE 2

Into a reactor equipped with heating and regulation means the following ingredients are loaded simultaneously:

2,910 parts of dimethylterephthalate
1,530 parts of 1,4-butanediol
0.66 parts of triethanolaminepolytitanate The temperature is gradually raised and when the mass reaches 167°C, the formation of alcohol begins. After 80 minutes, nearly all the theoretically produced methanol is distilled and the temperature of the mass reaches 240°C. 0.66 part of triethanolaminepolytitanate is added again. At 245°C, 66 parts of a 20% titanium oxide suspension by weight in 1,4-butanediol are introduced.

When the mass temperature reaches 250°C, the pressuure is gradually reduced in the apparatus in order to reach 50 torrs within 20 minutes. Then, 91.3 parts of N,N-di($\omega$-hydroxyhexyl) benzylamine are added by means of a vacuum-locked chamber. The pressure is reduced after 25 minutes down to about 1 torr. Then, polycondensation is carried out at 257°C for 45 minutes under 0.6 torr.

The polymer obtained is extruded into water, granulated, dried and has the following characteristics:

| | |
|---|---|
| VI | 960 |
| Viscosity in the molden state at 260°C | 1,950 poise |
| Softening point | 224.6°C |
| End-groups COOH/ton of polymer | 15 |
| Nitrogen ratio in relation to the polymer | 0.13% |

Distillates are recovered and treated as in Example 1. Results are given in Table I below.

This polyesteramine is than melted at 252°C and extruded through a spinneret pierced with 23 orifices having 0.34 mm diameter. After pin-drawing at 80°C and plate-drawing at 120°C at a draw ratio of 4.8 X, yarns exhibit the following characteristics:

| | |
|---|---|
| Count | 72 dtex |
| Tenacity | 41.3 g/tex |
| Elongation | 9% |

A 2.5 g skein made of this polymer is dyed in 125 ml of a dye bath containing:

0.4 g of CI Acid Red 266
1 g of Diammonium phosphate
0.5 g of a Condensate of stearyl- and oleylamines on ethylene oxide
Water sufficient to obtain 1 liter.

Dyeing is carried out at the boil for 1 hour in the presence of:
trichlorobenzene : 20% in relation to the yarn
acetic acid : 50% in relation to the yarn After boiling 1 hour, the bath is nearly exhausted and yarns are colored red. This coloration resists washing at 60°C in soapy water and washing in acetone.

EXAMPLE 3: (Comparative)

The reaction is carried out as in Example 1, but the N,N-di($\omega$-hydroxyhexyl)benzylamine is added at the beginning of the reaction.

Results are given in Table I, as follows:

TABLE I

| Examples | % distilled methanol | Moment of amine introduction | % decomposed amine |
|---|---|---|---|
| 1 | 95 | polycondensation. under 200 torrs at 250°C | 5.25 |
| 2 | 99 | polycondensation under 50 torrs at 253°C | 0.9 |
| 3 | 0 | original load | 25% |

EXAMPLE 4

A. For comparison, a polyester is prepared as follows:

Into the same type of reactor as in Example 1 there are introduced:

3,880 parts of dimethylterephthalate
2,250 parts of 1,4-butanediol
0.9 parts of triethanolaminepolytitanate The temperature is gradually increased until after 1½ hours the mass temperature reaches 240°C. Then, 0.9 parts of triethanolamine polytitanate and 1.8 part of triethanolamine are added.

At 245°C, 88 parts of a 20% titanium oxide suspension by weight in the 1,4-butanediol are introduced. When the mass temperature reaches 250°C, the vacuum is gradually applied in order to reach 1 torr after 45 minutes. Polycondensation is then carried out at 257°C for 45 minutes under 0.5 torr.

The polymer is extruded into water, granulated, dried and has the following characteristics:

| | |
|---|---|
| VI | 980 |
| Viscosity in the molten state at 260°C | 2,300 poise |
| Softening point | 225.3°C |

The polymer melted at 255°C is extruded through a spinneret pierced with 23 orifices having 0.34 mm in diameter and the filaments obtained after drawing 5 $x$ on a pin at 80°C and a plate at 120°C exhibit the following characteristics:

| | |
|---|---|
| Count | 77 dtex |
| Tenacity | 38.5 g/tex |
| Elongation | 11% |

A dye bath identical to that of Example 1 is prepared and a 2.5 g skein of the yarn is dyed in 125 ml of this bath. Dyeing is carried out for one hour in the presence of:

Trichlorobenzene : 20% in relation to the yarn
Acetic acid : 50% in relation to the yarn The yarns obtained after this treatment are slightly pink, whereas the bath remained unchanged. After washing in soapy water at 60°C and in acetone, the slight pink tint disappears and yarns again become practically white.

B. Into a stainless steel reactor fitted with heating and regultion means, there are loaded simultaneously:
  3,880 parts of dimethylterephthalate
  2,250 parts of 1,4-butanediol
  0.9 part of polytriethanolaminetitanate.

The mass temperature is gradually increased until at 168°C, the formation of alcohol starts. At 240°C, 0.9 part of triethanolaminepolytitanate is added. At 250°C, 127 parts of N(3,5-dimethoxycarbonyl benzyl) piperidine are added. The pressure is then reduced down to about 1 torr within 30 minutes. Polycondensation is carried out for 20 minutes at 252°C under 0.8 torr.

The polymer obtained is extruded into water, granulated, dried and has the following characteristics:

| | |
|---|---|
| VI | 960 |
| Viscosity in the molten state | 1,990 poise |
| Softening point | 222.2°C |
| End-groups —COOH/ton of polymer | 10 |
| Nitrogen ratio in relation to the polymer | 0.13% |

The polyesteramine so obtained is melted at 255°C and extruded through a spinneret pierced with 23 orifices having 0.34 mm diameter. After drawing 4.4 x on a pin at 85°C and a plate at 120°C, the yarns exhibit the following mechanical properties:

| | |
|---|---|
| Count | 51 dtex |
| Tenacity | 29 g/tex |
| Elongation | 10% |

A bath is prepared as follows:
  0.4 g CI Acid Blue 40
  1 g of diammonium phosphate
  0.5 g of a condensate of stearyl- and oleylamines on ethylene oxide
  Sufficient deionized water to make 1 liter A 2.5 g skein of this yarn is dyed in 125 ml of the dye bath prepared in a bath (ml)/yarn (g) ratio 50 in the presence of
  Trichlorobenzene : 20% in relation to the yarn
  Acetic acid : 50% in relation to the yarn After boiling for 1 hour, the bath is practically exhausted. The skein is colored dark blue, the coloration being fast to washing at 60°C in soapy water and in acetone.

EXAMPLES 5 to 9

Example 5

Into a stainless steel reactor provided with heating and regulation means are loaded simultaneously:
  3,880 parts of dimethylterephthalate
  2,250 parts of 1,4-butanediol
  0.90 part of triethanolaminepolytitanate Transesterification starts at about 161°C and after about 1 hour, all of the theoretically produced methanol is obtained. When the mass temperature reaches 240°C, 0.90 part of triethanolaminepolytitanate is added. At 250°C, the pressure is gradually reduced in the apparatus in order to obtain 0.7 torr within 30 minutes. Polycondensation is continued for 20 minutes at 254°C. The distillates recovered during the operation are collected, diluted with water to fivefold their volume and titrated with hydrochloric acid in the presence of methyl red.

In Examples 6, 7, 8 and 9 the operation is identical with the difference being the moment of the amine introducton.

The results of all these examples are given below in Table II.

TABLE II

| | | | | Polymer characteristics | | |
|---|---|---|---|---|---|---|
| | | | | | Viscosity in the molten state at 260°C | Softening point (°C) |
| Examples | Moment of amine introduction | % distilled methanol | % decomposed amine | VI | | |
| 5 | at the beginning | 0 | 60 | | | |
| 6 | before vacuum creation at 250°C | 95 | 34.5 | 945 | 1195 | 224.3 |
| 7 | under 200 torrs at 252°C | 99 | 18 | 905 | 1150 | 224.5 |
| 8 | under 50 torrs at 253°C | 99 | 15.5 | 860 | 1450 | 224.2 |
| 9 | under 0.8 torrs at 253°C | 100 | 7 | 905 | 1680 | 224.7 |

In Example 9, the amine is necessarily introduced with vacuum break. Thus the mass temperature, though slightly preheated, is reduced by some degrees, and the pressure in the autoclave increases concequently to some nitrogen pressure in the vacuum-locked chamber over the amine designed to prevent any air penetration. This pressure is necessarily greater to that in the autoclave in order to allow the introduction of the whole product.

As a result, the conditions in Example 9 do not represent the temperature and pressure conditions under which the amine is introduced but rather the polymer conditions or the polycondensation degree immediately before this introduction.

The polycondensation conditions of the reaction just before adding the amine are recovered within about 10 minutes.

For comparison, if the nitrogen pressure is equal in the vacuum-locked chamber to that in the autoclave (0.8 torr), as soon as the amine is contacted with the polymar mass, it is instantly vaporized. From a mechanical standpoint it will carry along a certain amount of the molten polymer, and the foams produced will travel to the unheated portions of the vacuum circuit (i.e. narrowings, valves, knees, cooling coils etc.) where they will solidify and clog the vacuum line. Thus the vacuum cannot be maintained and accordingly polycondensation cannot be continued.

The polymer of Example 8 is extruded in water, granulated, dried and has the following characteristics:

| | |
|---|---|
| VI | 860 |
| Viscosity in the molten state | 1,450 poise |
| Softening point | 224.2°C |
| End-groups —COOH/ton | 15 |
| Nitrogen ratio in relation to the polymer | 0.05% |

The polyesteramine so obtained is extruded through a spinneret pierced with 23 orifices having 0.34 mm diameter. The filaments are then pin-drawn at 85°C and plate-drawn at 120°C at a draw ratio of 5 X.

Yarns obtained exhibit the following characteristics:

| | |
|---|---|
| Count | 56 dtex |
| Tenacity | 31 g/tex |
| Elongation | 16% |

A small skein is dyed under the same conditions as those of Example 4B.

After boiling for 1 hour, the bath is nearly exhausted. The dark blue coloration of the yarns remains practically unchanged after washing at 60°C in soapy water and in acetone.

EXAMPLE 10

The following ingredients are introduced into the same reactor as in Example 1:
  2,480 parts of dimethylterephthalate
  620 parts of dimethylisophthalate
  2,540 parts of 1,4-dimethanol cyclohexane
  1.7 parts of triethanolaminepolytitanate The temperature is gradually increased and when it reaches 164°C, formation of the alcohol starts. After 1 hour and 45 minutes, all of the theoretically produced methanol is distilled.

The temperature is then at 276°C. Vacuum is gradually applied and after 20 minutes, under a pressure of 50 torrs, 97 parts of N,N-di($\omega$-hydroxyhexyl)hexylamine are added by means of a vacuum-locked chamber. The pressure is reduced down to 1.4 torrs within 10 minutes and polycondensation continues for one hour at 284°C.

The polymer obtained has the following characteristics:

| | |
|---|---|
| VI | 730 |
| Viscosity in the molten state at 290°C | 1,200 poises |
| Softening point | 255.4°C |
| Nitrogen ratio in the polymer | 0.092% |

After drying, the polymer is melted at 260°C and extruded through a spinneret pierced with 23 orifices having 0.34 mm diameter. Yarns obtained after drawing at a draw ratio of 4.1 X on a pin at 80°C and a plate at 120°C have the following characteristics:

| | |
|---|---|
| Count | 65 dtex |
| Tenacity in the dry state | 24.3 g/tex |
| Elongation | 15.6% |

Dyeing is carried out under the same conditions as in Example 2. After boiling 1 hour, though the dye bath is not completely exhausted, the yarns are red and their coloration is fast to washing at 60°C in soapy water and to washing in acetone.

EXAMPLE 11

The following ingredients are introduced into a reactor identical to that in Example 1.
  3,880 parts of dimethylterephthalate
  2,840 parts of 1,6-hexanediol
  5 parts of polybutyltitanate The temperature is gradually increased with the formation of alcohol starting at about 155°C. After one and a half hours, nearly all of the theoretically produced methanol is distilled. The temperature is then 236°C. The temperature is again gradually increased and when it reaches 250°C, a vacuum is gradually applied. After 20 minutes, when the pressure is about 50 torrs, 123 parts of bis($\omega$-hydroxylhexyl)benzylamine are added by means of a vacuum-locked chamber. Within 20 minutes a pressure of 1.2 torrs is reached. Polycondensation is carried out at 255°C for one hour.

A white polymer is obtained with the following characteristics:

| | |
|---|---|
| VI | 670 |
| Viscosity in the molten state at 260°C | 200 poise |
| Viscosity in the molten state at 200°C | 550 poise |
| Melting point | 144°C |
| Nitrogen ratio in relation to the polymer | 0.113% |

The polyesteramine, molten at 160°C, is extruded through a spinneret pierced with 23 orifices having 0.34 mm diameter.

The yarns obtained after drawing them 3.9 x on a pin at 80°C and a plate at 90°C exhibit the following characteristics:

| | |
|---|---|
| Count | 120 dtex |
| Tenacity in the dry state | 12.2 g/tex |
| Elongation | 8.8% |

A 2.5 g skein of this yarn is dyed for one hour at 90°C in a dye bath containing CI Acid Red 266 (4% in relation to the yarn) in the presence of acetic acid (50% in relation to the yarn). The yarn takes a red coloration which is fast to washing in soapy water and in acetone and the dye bath is practically exhausted.

EXAMPLE 12

Into a stainless steel reactor the following ingredients are loaded simultaneously:
  3,880 parts of dimethylterphthalate
  2,2250 parts of 1,4 butanediol
  0.9 part of triethanolaminepolytitanate
  135 parts of 3,5-dicarbomethoxy-NN-dibutylamino-1-methyl benzene The formation of alcohol starts at 166°C and after about 1 hour nearly all of the methanol is distilled.

At 240°C, 0.9 part of polytriethanolaminetitanate is added and at 245°C, 88 parts of a 1,4-butanediol suspension with 20% titanium oxide are then added. A vacuum is gradually applied at 250°C within 30 minutes. The polycondensation is carried out for 45 minutes at 254°C under 1 torr. pressure.

The analysis of the distillates shows that 11.25% of the amine employed has been decomposed into light amines.

EXAMPLE 13

This example is similar to the previous one with the difference being that the 3,5-dicarbomethoxy NN-dibutylamino-1-methyl benzene is introduced, just before the creation of a vacuum at the temperature of 250°C when 95% of the methanol is distilled.

Under these conditions, the fraction of decomposed amine is only 6.75%.

COMPARATIVE EXAMPLES (14 to 17)

EXAMPLE 14:

Into an autoclave fitted with the usual heating and regulation means, there is loaded simultaneously:
  3,880 parts of dimethylterephthalate
  2,250 parts of 1,4-butanediol
  0.9 part of triethanolaminepolytitanate Transesterification starts at 163°C. After one hour of heating, 48 parts of methyldiethanolamine and 0.9 part of triethanolaminepolytitanate are added. The mass temperature is then 188°C.

After 50 minutes, the mass is colored slightly yellow. When the mass temperature reaches 250°C, a vacuum is 2 torrs is applied gradually within 25 minutes. Polycondensation is continued for 35 minutes at 254°C under 0.7 torr. The polymer obtained is viscous and colored slightly yellow. It contains a nitrogen percentage of 0.05% by weight in relation to the polymer. An analysis of the basicity of the distillates shows that 58% of the amine used have been distilled in the form of light amines.

A dyeing test carried out on granulated polymer with CI Acid Red 266 in a bath ratio of 50 and under the same conditions as in the example 4B, shows a very low dyeing affinity with the dyeing bath not being exhausted at all after boiling 1 hour.

EXAMPLE 15

Into an autoclave heated and stirred are loaded simultaneously:
  3,880 parts of dimethylterephthalate
  2,250 parts of 1,4-butanediol
  0.9 part of polytriethanolaminetitanate Transesterification begins at 168°C. After one hour and 25 minutes, the mass temperature reaches 220°C. At 240°C, 0.9 part of triethanolaminepolytitanate and at 250°C, 73 parts of phenyldiethanolamine are added and a vacuum of 2 torrs is applied gradually within 30 minutes. The polycondensation is continued for 40 minutes at 253°C. under 0.7 torr.

The polymer obtained is viscous with a slight yellor color. It contains 0.13% by weight nitrogen in relation to the polymer.

A dyeing test on the granulated polymer is carried out under the same conditions as in the example 4B with the CI Acid Blue 120. The results show practically a non-existent dye affinity.

EXAMPLE 16

The same autoclave as in all the previous examples is used and it is loaded simultaneously with:
  3,880 parts of dimethylterephthalate
  2,250 parts of 1,4-butanediol
  0.9 part of polytriethanolaminetitanate 161 parts of dimethyl N,N-dibenzylaminomethyl-5-isophthalate Transesterification starts at 161°C and after one hour and 15 minutes, the mass temperature reaches 222°C. At 240°C 0.9 part of triethanolaminpolytitanate is added. Then at 250°C, a vacuum of 2 torrs is applied gradually within 30 minutes. Polycondensation is continued for 35 minutes at 254°C under 0.7 torr until the required viscosity is obtained.

The polymer contains 0.13% by weight nitrogen and is very white. It is not dyed under usual dyeing conditions, although the thermal stability of the amine used is excellent.

EXAMPLE 17

Into the same autoclave as in the previous examples is loaded
  3,880 parts of dimethylterephthalate
  3,100 parts of ethyleneglycol
  1.88 parts of manganese acetate
  1.57 parts of antimony trioxide Transesterification begins at 161°C and after one hour and 15 minutes, the mass temperature reaches 212°C. At 225°C, 10.2 parts of 7% phosphorous acid are added and at 2300°C, 110 parts of a suspension consisting of 20% by weight of titanium oxide in glycol are added. At 250°C, a vacuum is applied gradually and the temperature is increased. When the pressure reaches 100 torrs and the mass temperature is at 262°C, 61.5 parts of benzyl dihexanolamine are added by means of a vacuum-locked chamber.

A slight yellowing of the reaction mass is then observed. After 35 minutes from the start of vacuum creation, the pressure is 0.8 torr and the mass temperature is 270°C. Polycondensation is carried out under this pressure at 278°C for 1 hour. Some prepolymer is carried through the vacuum conduits which require frequent cleaning.

The polymer obtained is poured into water and it exhibits a strong greenish brown color. The nitrogen content is 0.63% by weight of the polymer.

After drying, the polymer is extruded at 272°C through a spinneret pierced with 23 orifices having 0.4 mm diameter and an unpleasant smell spreads everywhere disturbing the operation. Then, filaments are drawn at a ratio of 5 X on a pin at 80°C and a plate at 120°C. A number of filament breaks during the drawing is observed.

Dyeing tests carried out as in the example 4B show that baths are not exhausted after boiling for 1 hour. Dye affinity is medium, but the yellowing of the untreated polymers makes the marketing of such yarns impossible.

EXAMPLE 18

Into an autoclave fitted with the usual heating and regulation means, is loaded simultaneously:
  3,880 parts of dimethylterephthalate
  2,250 parts of 1,4-butanediol
  0.9 part of polytriethanolaminetitanate Transesterification starts at 161°C and after 1 hour and 30 minutes the theoretical amount of methanol is obtained as the mass temperature reaches 240°C. Then an additiional 0.9 part of triethanolaminepolytitanate is added and the temperature is increased to 250° within 10 minutes. A vacuum of about 1 torr is applied gradually within 40 minutes. When the pressure reaches 100 torrs in about 15 minutes after the beginning of the vacuum creation, 137 parts of ethyl N,N-dibutylamino-11 undecanoate are added through a vacuum-locked chamber.

Polycondensation is then carried out at 254°C under 0.5 torr for 1 hour and 55 minutes. The polymer is cast and granulated, with the following properties:

Viscosity in the molten state at 260°C : 1,930 poise
Percentage of nitrogen fixed on the polymer : 0.1%

After suitable drying, granules are extruded through a spinneret pierced with 23 orifices having 0.34 mm diameter at 255°C. Yarns are drawn 4.7 X on a pin at 80°C and on a plate at 120°C.

| Count | 100 dtex |
|---|---|
| Resistance | 33.9 g/tex |
| Elongation | 18% |

A dye bath is prepared as follows:
0.4 g of CI Acid Red 266
1 g of Diammonic phosphate
0.5 g of Condensate of stearyl and oleylamines on ehtylene oxide
Sufficient water to make 1 liter.

Dyeing at the boil is done with a bath (ml) /yarn (g) ratio equalling 100, in the presence of:
20% of trichloro-1,2,4 benzene in relation to the yarn
50% of acetic acid in relation to the yarn After one hour, the bath is practically exhausted. The small skein has a dark red coloration which is fast to washing in soapy water at 50°C and in acetone.

EXAMPLE 19

Conditions are identical to those described in Example 18, but the 137 parts of ethyl N,N-dibutylamino-11 undecanoate are replaced by 120 parts of N-(ω-carboxyethyl undecyl)morpholine.

The polymer obtained, containing 0.1% nitrogen, is spun under conditions identical to those of Example 18, and yarns exhibiting the following characteristics are obtained:

| Count | 78 dtex (23 filaments) |
|---|---|
| Resistance | 32 g/tex |
| Elongation | 18.5% |

Dyed under the conditions of Example 18, these filaments practically exhaust the bath and are red colored, this coloration being fast to washing in soapy water at 50°C and in acetone.

What is claimed is:

1. White spinnable and moldable polyesteramine with good dye affinity for anionic dyestuffs derived from
   a. at least an aromatic dicarboxylic diacid and possibly a small amount of an aliphatic diacid,
   b. at least a diol selected from the group consisting of an aliphatic diol, a saturated alicyclic diol and a cycloaliphatic diol, said diol having at least three carbon atoms in the molecule, and
   c. at least a compound of the formula $NR_3$ where R, being the same or different, is alkyl, saturated alicyclic, cycloalkyl or arylaliphatic, or
   where two R groups form a cycle between them;
   said $NR_3$ compound having 1, 2 or 3 R groups containing 0, 1, 2 or 3 ester generating groups with the total number of ester generating groups being 1 to 3;
   said $NR_3$ compound having no mire than two R groups being arylaliphatic or cycloaliphatic which have only one carbon atom between the cycle and the nitrogen atom or being saturated alicyclic;
   said $NR_3$ compound having at least 3 or more carbon atoms between each said ester generating group and the nitrogen atom; and
   the total amount of said $NR_3$ compound being present so that the percentage of nitrogen fixed on the polymer is from 0.3% to 1.0% by weight of the polymer.

2. Process for the production of polyesteramine according to claim 1, wherein said diol having at least 3 carbon atoms is allowed to react with the methyl ester of said diacid and in which said $NR_3$ compound is added after at least 90% by weight of the theoretically produced methanol is eliminated from the reaction medium.

3. Shaped articles with good dye affinity for anionic dyestuffs, obtained from polyesteramine according to claim 1.

4. A process for the production of polyesteramine according to claim 1, wherein said total amount of said $NR_3$ compound being present to that the percentage of nitrogen fixed on the polymer is from 0.03% to 0.5%.

5. A process of the production of polyesteramine according to claim 1, wherein said diol is selected from the group consisting of 1,4-butanediol, 1,4-dimethanolcyclohexane and 1,6-hexanediol and said aromatic dicarboxylic acid is selected from the group consisting of terephthalic acid and isophthalic acid.

6. A process for the production of polyesteramine according to claim 2, wherein said total amount of said $NR_3$ compound being present so that the percentage of nitrogen fixed on the polymer is from 0.03% to 0.5%.

7. A process for the production of polyesteramine according to claim 2, wherein said diol is selected from the group consisting of 1,4-butanediol, 1,4-dimethanolcyclohexane and 1,6-hexanediol and said aromatic dicarboxylic acid is selected from the group consisting of terephthalic acid and isophthalic acid.

* * * * *